(12) United States Patent
Wang et al.

(10) Patent No.: US 7,182,713 B2
(45) Date of Patent: Feb. 27, 2007

(54) QUICK-COUPLING POST FOR TRAMPOLINE SAFETY FENCE

(75) Inventors: Teng Yi Wang, Taipei (TW); Chang I Wu, Taipei (TW)

(73) Assignee: Shen-Tai Industry Co., Ltd., Taipei (TW)

( * ) Notice: Subject to any disclaimer, the term of this patent is extended or adjusted under 35 U.S.C. 154(b) by 677 days.

(21) Appl. No.: 10/680,133

(22) Filed: Oct. 8, 2003

(65) Prior Publication Data

US 2004/0147370 A1 Jul. 29, 2004

(51) Int. Cl.
*A63B 21/00* (2006.01)

(52) U.S. Cl. .............................. 482/35; 482/27; 482/28

(58) Field of Classification Search ................. 482/35, 482/27, 28; 403/109.3, 109.2, 109.6
See application file for complete search history.

(56) References Cited

U.S. PATENT DOCUMENTS 2,991,841 A * 7/1961 Sampson et al. ............. 482/27

5,779,386 A * 7/1998 Eichhorn .................... 403/329
2002/0035605 A1   3/2002 McDowell et al.

FOREIGN PATENT DOCUMENTS

| EP | 1 199 63 A | 4/2002 |
| WO | WO 00/22860 A | 4/2000 |

* cited by examiner

*Primary Examiner*—Jerome Donnelly
(74) *Attorney, Agent, or Firm*—Troxell Law Office, PLLC

(57) ABSTRACT

A quick-coupling post for trampoline safety fence is formed from a plurality of sequentially connectable hollow sections and an elastic connecting element mounted in each section. Each of the hollow sections has an upper portion adapted to fitly extend into a lower portion of another section to align two through holes separately provided at the upper and the lower portion of the two hollow sections, respectively. The elastic connecting element is in the form of a letter V to include two normally outward stretched arms that naturally elastically press against two opposite inner surfaces of the hollow section. One of the two arms is provided at a free end with a short shaft tube that elastically extends through the two aligned through holes on two coupled hollow sections to hold the two coupled sections in place relative to each other.

3 Claims, 4 Drawing Sheets

QUICK-COUPLING POST FOR TRAMPOLINE SAFETY FENCE

FIELD OF THE INVENTION

The present invention relates to a quick-coupling post for trampoline safety fence, and more particularly to a post for trampoline safety fence including a plurality of sections that can be sequentially connected with one another quickly and conveniently.

BACKGROUND OF THE INVENTION

A trampoline typically includes a round frame positioned on floor via vertical posts, and a jumping bed connected to and tightly stretched over the round frame via a plurality of elastic elements radially extended between the jumping bed and the frame. A user may stand on the jumping bed to continuously do various jumping movements. Since it is uncertain in what direction the user would fall after bouncing off from the jumping bed, accidents often occur, particularly when the user is a child. Therefore, it is necessary for the conventional trampoline to equip with safety means.

U.S. Pat. No. 6,261,207 granted to Publicover et al. discloses a trampoline safety fence for enclosing a space immediately above the jumping bed, so as to protect a user from any unexpected injury caused by colliding against the round frame or bouncing and falling to the ground outside the jumping bed.

To erect the safety fence that has a predetermined height, it is necessary to provide additional posts spaced along the whole round frame, so as to support the safety fence thereon. The additional posts for supporting the safety fence are relatively high and usually formed from a plurality of sections to be sequentially assembled together. It is normally very troublesome and time-consuming to assemble the sections of the conventional posts for supporting the trampoline safety fence.

SUMMARY OF THE INVENTION

A primary object of the present invention is to provide a quick-coupling post for trampoline safety fence, so that the posts for supporting the trampoline safety fence may be quickly and conveniently assembled and disassembled at reduced labor and time costs.

To achieve the above and other objects, the posts for trampoline safety fence according to the present invention are connected to an inner side of the whole round frame of the trampoline at intervals of a predetermined distance by way of suitable connection procedures, and each of the posts includes a hollow base section and a plurality of hollow upper sections. The sections may be sequentially connected to form a post having a required height for supporting the safety fence.

Each of the hollow sections has an upper portion adapted to fitly extend into a lower portion of another section to align two through holes separately provided at the upper and the lower portion of the two hollow sections, respectively. An elastic connecting element in the form of a letter V to include two normally outward stretched arms is mounted in each of the hollow sections, so that the two arms naturally elastically press against two opposite inner surfaces of the hollow section. One of the two arms is provided at a free end with a short shaft tube that elastically extends through the two aligned through holes on two coupled hollow sections to hold the two coupled sections in place relative to each other.

In an operable embodiment of the present invention, the shaft tube is provided at two opposite positions with two axially extended slots to provide the shaft tube a certain degree of elasticity and clamping force. And, a solid plug may be mounted in the shaft tube.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
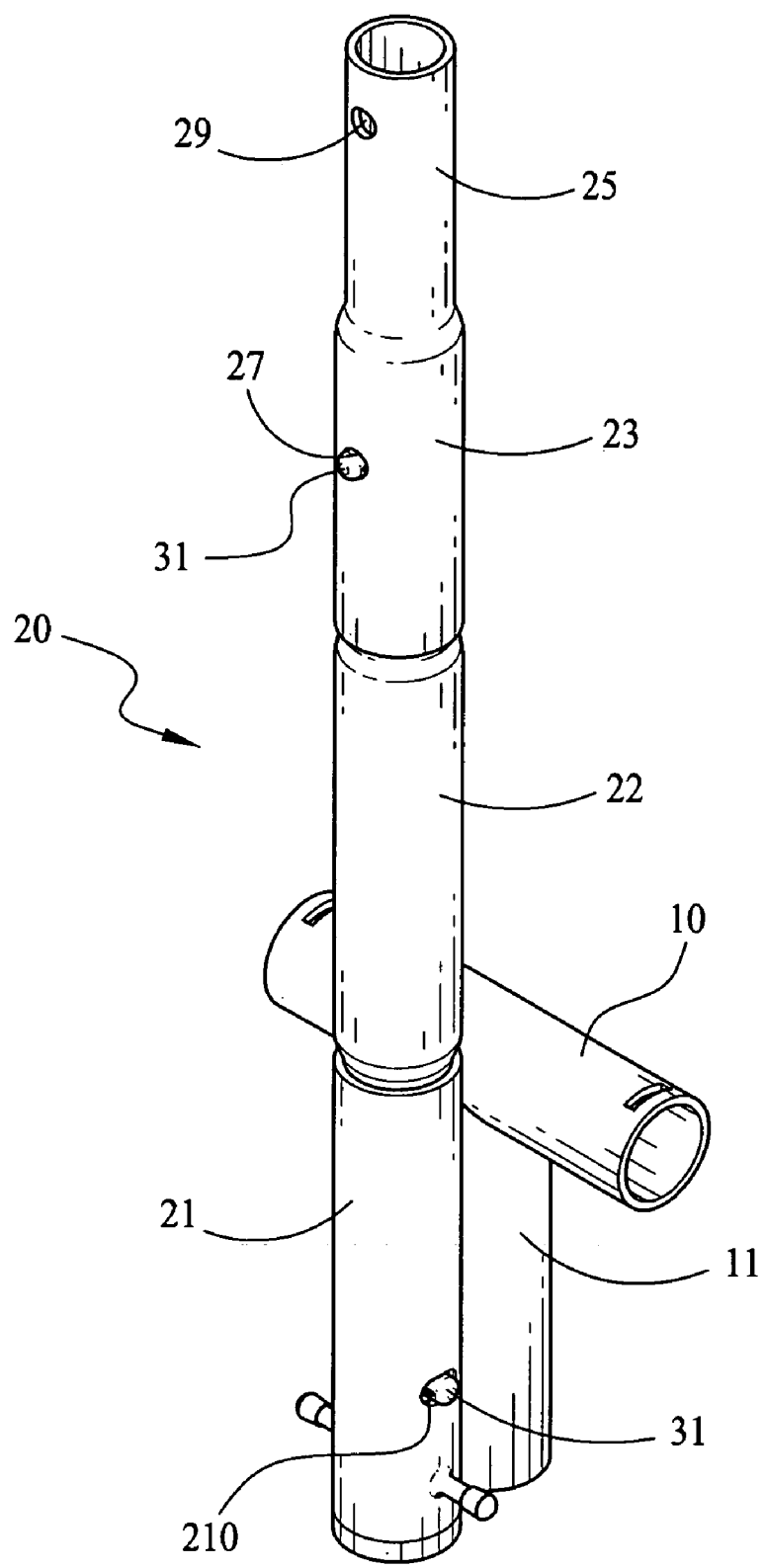
FIG. 1 is a fragmentary assembled perspective view of the quick-coupling post for trampoline safety fence according to the present invention.

Please refer to FIG. 1 that is a fragmentary assembled perspective view of a quick-coupling post 20 of the present invention connected by, for example, welding to an inner side of a round frame 10 and a vertical post 11 of a trampoline. In actual use, a plurality of the quick-coupling posts 20 are spaced along the inner side of the round frame 10 corresponding to the vertical posts 11, so as to support a safety fence thereon.

In a preferred embodiment of the present invention, each of the quick-coupling posts 20 is formed from a hollow base section 21 and more than one sequentially connectable hollow upper section 22, 23. The base section 21 and the first upper section 22, and any two adjacent upper sections 22, 23 are connected together using the same coupling structure.

Figure 2:
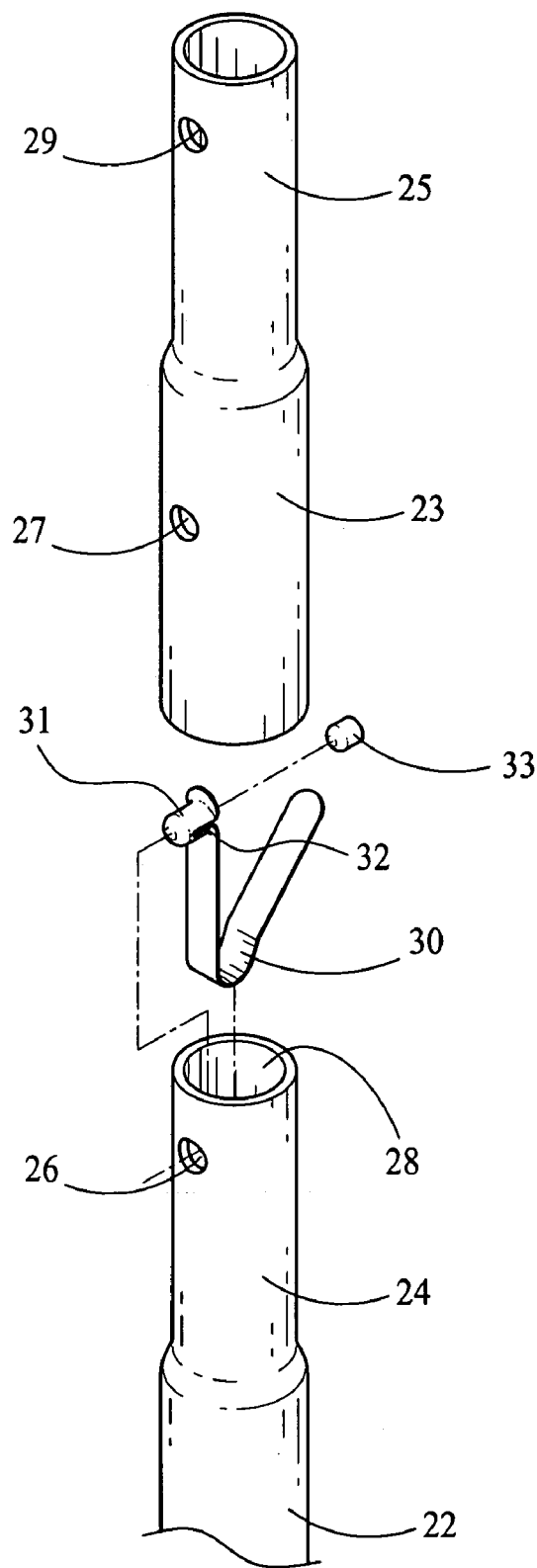
FIG. 2 is an exploded perspective view showing the manner of connecting two upper sections of the quick-coupling post of FIG. 1.

Please refer to FIG. 2 that is a fragmentary exploded perspective view of two upper sections 22, 23 of the quick-coupling post 20 of the present invention. The upper sections 22, 23 will now be taken as an example to describe the manner of sequentially connecting the upper sections to form the post 20. As shown, the first upper section 22, which forms the lowest one of the upper sections of the post 20 located directly above the base section 21 (not shown in FIG. 2, please see FIG. 1), includes a diameter-reduced upper portion 24 adapted to extend into and fitly engage with a lower portion of a second upper section 23 above the first upper section 22. Similarly, the second upper section 23 includes a diameter-reduced upper portion 25 adapted to extend into and fitly engage with a lower portion of a third upper section (not shown). By sequentially connecting the diameter-reduced upper portion of a section at a lower position to the lower portion of a section at a higher position, a safety fence post 20 having a desired overall height may be formed.

As can be clearly seen from FIG. 2, the first upper section 22 is provided at the diameter-reduced upper portion 24 with a radially extended high through hole 26, and the second upper section 23 is provided at the lower portion with a radially extended low through hole 27. The high through hole 26 and the low through hole 27 are aligned and communicable with each other when the diameter reduced portion 24 of the first upper section 22 has been fully extended into the lower portion of the second upper section 23.

An elastic connecting element 30 is positioned in a hollow space 28 defined in the first upper section 22. The elastic connecting element 30 is made of a metal material and in the form of a letter V to include two normally outward stretched arms. A short shaft tube 31 is formed at a free end of one of the two stretched arms by way of punching. The shaft tube 31 has an outer diameter slightly smaller than a diameter of the through holes 26, 27. In a most preferred embodiment of the present invention, the shaft tube 31 is provided on its wall with two diametrically opposite and axially extended slots to provide the shaft tube 31 with a certain degree of elasticity and accordingly a clamping force, so that a solid plug 33 may be fitly received in the shaft tube 31.

Figure 4:
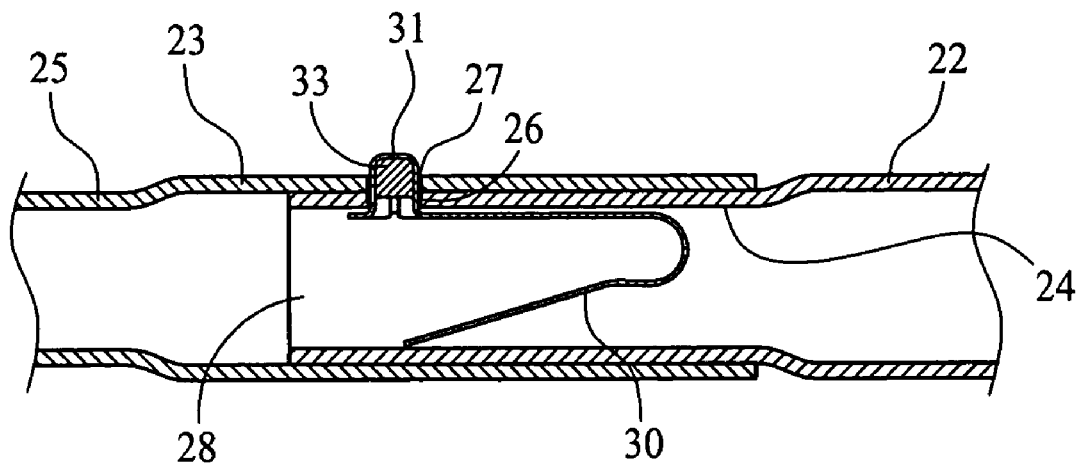
FIG. 4 is a sectional view showing two upper sections of the present invention in a connected state.
Figure 5:
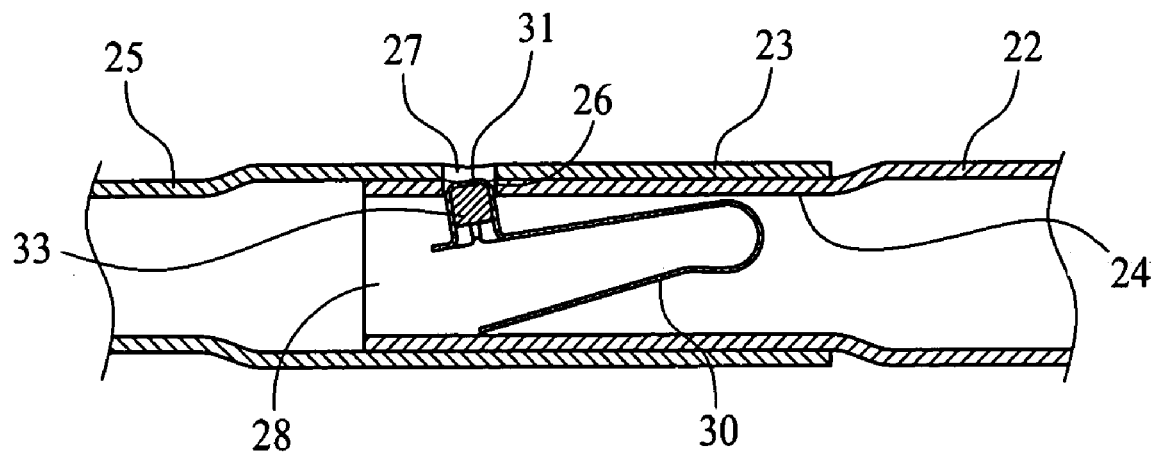
FIG. 5 is a sectional view similar to FIG. 4 but showing the manner of separating the two upper sections from one another.

When the V-shaped elastic connecting element 30 is mounted in the hollow space 28 defined in the first upper section 22, the two outward stretched arms of the connecting element 30 naturally elastically press against two opposite inner wall surfaces of the hollow space 28 with the shaft tube 31 and the solid plug 33 fitted therein elastically extended through and exposed from the high through hole 26. The first upper section 22 is now ready for coupling with the second upper section 23. Please refer to FIGS. 4 and 5 at the same time. When the second upper section 23 is fitted at the lower portion around the diameter reduced upper portion 24 of the first upper section 22 having the elastic connecting element 30 mounted therein, the shaft tube 31 and the internal solid plug 33 are slightly pushed backward into the through hole 26. When the second upper section 23 is kept moved along the diameter-reduced upper portion 24 of the first upper section 22 and the low through hole 27 reaches at the high through hole 26, the radially inward pushed shaft tube 31 and solid plug 33 are radially outward pushed by a restoring force of the elastic connecting element 30 to extend into the low through hole 27. That is, the shaft tube 31 and the solid plug 33 are extended through the two aligned holes 26, 27 at the same time, as shown in FIG. 4. At this point, the connection of the first upper section 22 to the second upper section 23 is completed. On the contrary, when the shaft tube 31 and the solid plug 33 are radially inward pushed to separate from the through hole 27, as shown in FIG. 5, the second upper section 23 may be easily separated from the first upper section 22.

The second upper section 23 is provided on a diameter-reduced upper portion 25 thereof with a radially extended through hole 29, and another elastic connecting element 30 may be mounted in the upper portion of the second upper section 23 with the shaft tube 31 and solid plug 33 engaged with the through hole 29. Thereafter, a further upper section (not shown) having the same structure as the upper sections 22, 23 may be connected to the second upper section 23 in the same manner as described in the above paragraph. In this manner, a plurality of upper sections may be sequentially connected to provide a safety fence post 20 having a desired overall height.

Figure 3:
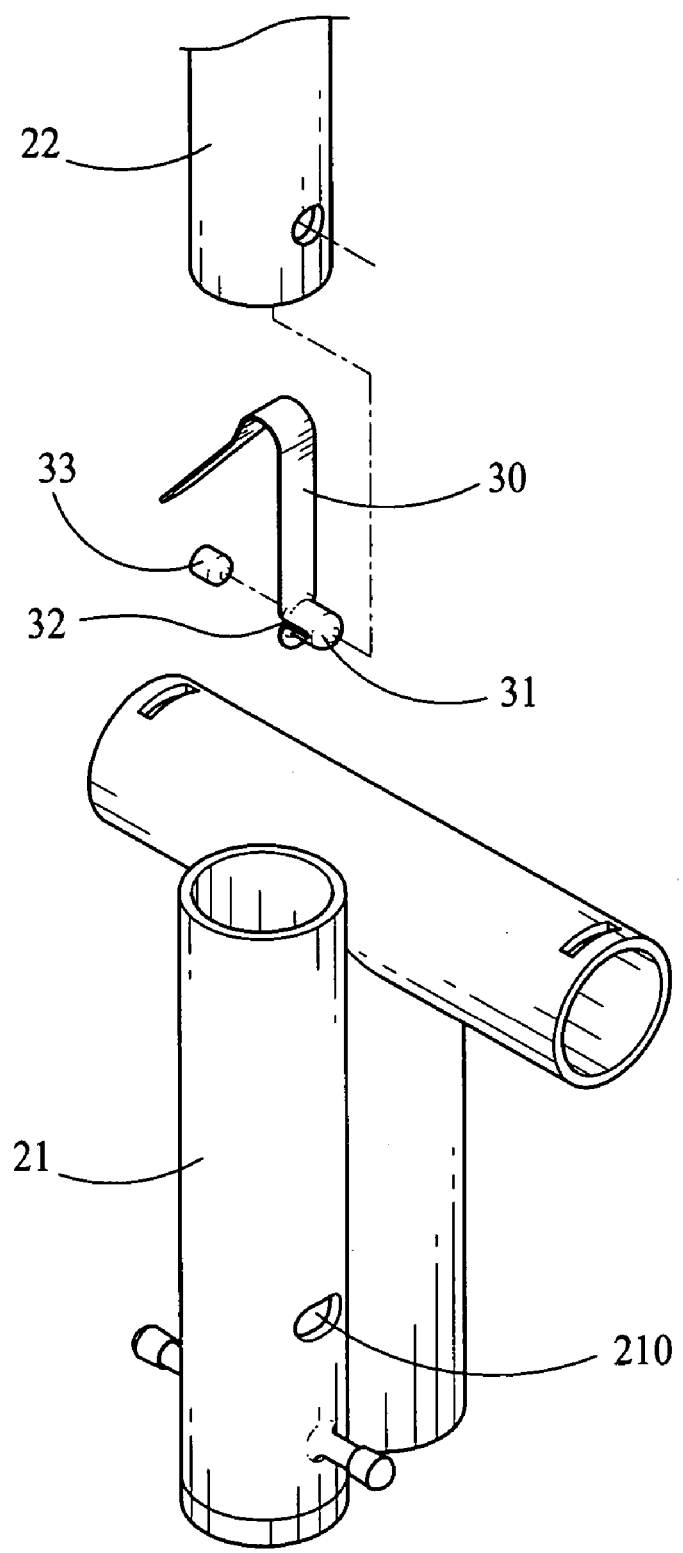
FIG. 3 is an exploded perspective view showing the manner of connecting an upper section with a base section of the quick-coupling post of FIG. 1.

Please refer to FIG. 3. The base section 21 is also connected to the lower portion of the first upper section 22 using the elastic connecting element 30. However, since the base section 21 is a load-bearing section located at the lowest position in the whole post 20 that extends a considerably large length, a transverse long hole 210 is provided on the base section 21 at a predetermined position for aligning with a low through hole provided at the lower portion of the first upper section 22 and absorbing any possible error in the size of the completed post 20.

After the elastic connecting elements 30 are separately mounted in the base and the upper sections 21, 22, 23, the sections may be sequentially coupled with one another very quickly to provide the safety fence post 20. Therefore, the erection of the posts 20 to support the whole safety fence of the trampoline may be done in a much quicker and more convenient manner.

The present invention has been described with a preferred embodiment thereof and it is understood that many changes and modifications in the described embodiment can be carried out without departing from the scope and the spirit of the invention that is to be limited only by the appended claims.

What is claimed is:

1. A quick-coupling post for supporting a safety fence enclosing a space immediately above a jumping bed tightly stretched over a round frame of a trampoline located on the ground via a plurality of vertical posts, said quick-coupling post being connected via predetermined processing procedures to an inner side of said round frame and said vertical posts, and comprising a hollow base section, said shaft tube having a solid plug tightly received therein and a plurality of hollow upper sections sequentially connectable to provide a desired overall length of said safety fence post, and a plurality of elastic connecting elements;

any of said hollow sections that is located at an upper position having a lower portion adapted to fitly extend into an upper portion of another said hollow section located at a lower position, such that two radially extended through holes separately provided at said lower and said upper portion of said upper and said lower hollow section, respectively, are aligned with each other; and said elastic connecting elements being separately positioned in said hollow sections, and each of said elastic connecting elements being in the form of a letter V to include two normally outward stretched arms, a short shaft tube being formed at a free end of one of said two stretched arms by way of punching and having an outer diameter slightly smaller than a diameter of said through holes provided on said hollow sections; and said V-shaped elastic connecting element being mounted in said hollow section with said two outward stretched arms naturally elastically press against two opposite inner wall surfaces of said hollow section and said shaft tube elastically extended into said two aligned through holes on two of said hollow sections that are vertically coupled with each other.

2. The quick-coupling post for supporting a safety fence as claimed in claim 1, wherein said shaft tube is provided on a wall thereof with two diametrically opposite and axially extended slots to provide said shaft tube with a certain degree of elasticity and clamping force.

3. The quick-coupling post for supporting a safety fence as claimed in claim 2, wherein said shaft tube has a solid plug fitly received therein.

* * * * *